C. C. GOSS.
BOTTLE CASING.
APPLICATION FILED JAN. 2, 1913.
1,073,897.
Patented Sept. 23, 1913.
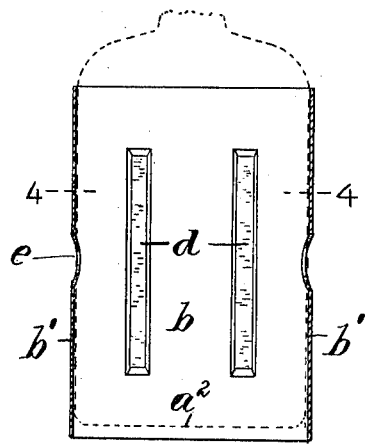
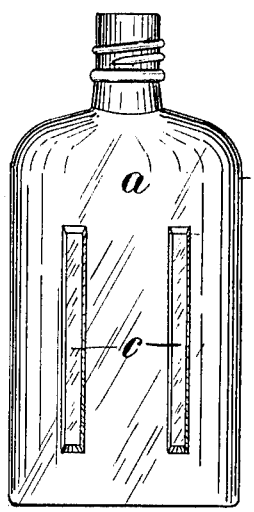
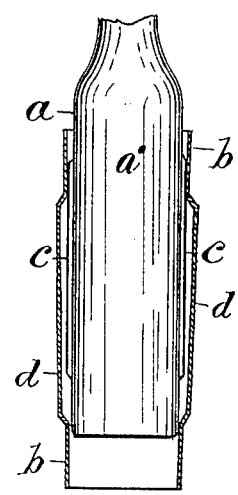
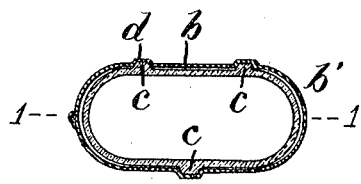
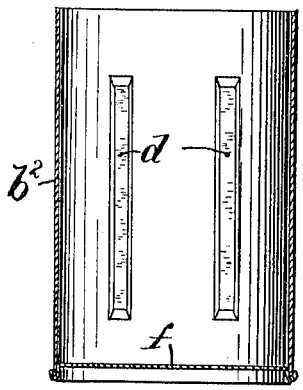

UNITED STATES PATENT OFFICE.

CHARLES C. GOSS, OF NEW YORK, N. Y.

BOTTLE-CASING.

1,073,897.

Specification of Letters Patent.   Patented Sept. 23, 1913.

Application filed January 2, 1913.   Serial No. 739,629.

*To all whom it may concern:*

Be it known that I, CHARLES C. GOSS, a citizen of the United States, residing at 157 West One Hundred and Twentieth street, New York, county of New York, and State of New York, have invented certain new and useful Improvements in Bottle-Casings, fully described and represented in the following specification and the accompanying drawings, forming a part of the same.

The object of this invention is to furnish a cheap and convenient casing for a pocket-flask, to avoid the breakage of the same; and the invention consists of a flask and casing provided respectively with ribs and sockets adapted to engage one another when the flask is inserted in the casing. The ribs and sockets are so constructed and disposed that they retain the casing safely upon the flask, while they permit the removal of the casing from the flask when necessary.

Figure 1 is a longitudinal section of a flask-casing on dotted line 1—1 in Fig. 4, with dotted outline of portion of a flask. Fig. 2 is an exterior view of a flask adapted for use with such casing; Fig. 3 is an edge view of portion of the same flask with a section of the casing partly fitted thereto; Fig. 4 is a section of the flask and casing taken on line 4—4 in Fig. 1. The casing shown in Figs. 1 and 4 is open at the bottom. Fig. 5 shows a similar casing but having a closed bottom, to adapt it for use as a drinking-cup.

The flask is shown with two flat sides $a$ and rounded edges $a'$ making it of the usual oval cross section, and the casing is made of corresponding shape with flat sides $b$ and rounded edges $b'$, and proportioned to fit loosely upon the flask, as shown in Fig. 4.

To engage the flask with the casing so as to hold it therein, longitudinal ribs $c$ are shown upon the flat sides of the flask and corresponding longitudinal sockets $d$ pressed within the sides of the casing.

The casing is formed of sheet-metal which is necessarily elastic, and when the flask is pushed in the casing the ribs crowd the flat sides apart, as shown in Fig. 3, until they enter the sockets, when the sides spring together again, thus engaging the ribs with the sockets and holding the flask from end movement within the casing.

The ends of the ribs and of the sockets are sloped or beveled, as shown in Figs. 1 to 3 inclusive, so that when it is desired to remove the flask from the casing the ribs may crowd the sides of the casing, as in Fig. 3, until they are wholly withdrawn from the casing.

The ribs correspond in length to the sockets so that when they fit therein the flask is held in a definite position immovably in the casing, and the distance from the ribs to the bottom of the flask is a little less than the distance from the socket to the end of the casing, thus holding the bottom of the flask normally above the bottom of the casing, as shown by the dotted lines $a^2$ in Fig. 1, which prevents the bottom of the flask from striking any object upon which it is set.

Two ribs and sockets are shown upon one side of the flask and casing and only one rib upon the other side, but it is immaterial how many ribs be used. It is noted, however, that the location of a socket and rib at the middle line of the flask and casing does not produce such a firm engagement of the parts as ribs and sockets located nearer to the edges of the flask and casing; because the middle of the casing yields most freely at a point intermediate to its two edges.

Peep-holes $e$ are shown in the edges of the casing in Fig. 1, to inspect the contents of the flask; but Fig. 5 shows a casing $b^2$ devoid of peep-holes and having a water-tight bottom $f$, such construction being adapted for use as a drinking-cup.

The sockets $d$ are shown in one side of the drinking-cup, the same as in Fig. 1; which serve to hold the casing upon the flask when not used as a cup.

From the above description it will be seen that the casing is safely secured upon the flask when necessary and may be removed when required by using sufficient force to pull it from the flask, and when formed with a bottom, as shown in Fig. 5, it may serve as a drinking cup.

Having thus set forth the nature of the invention what is claimed herein is:

1. The combination, with a flat sided flask, of a sheet-metal casing having elastic flat sides and adapted to fit loosely to the exterior of the flask, ribs upon the flat sides of one of such parts and corresponding sockets upon the flat sides of the opposite part adapted to engage one another longitudinally when the flask is inserted in the casing.

2. An elastic casing for a flask adapted to fit loosely upon the exterior of the flask, the casing and flask having longitudinal sockets and ribs provided with corresponding shoulders at the ends to retain the casing in a fixed position on the flask.

In testimony whereof I have hereunto set my hand in the presence of two subscribing witnesses.

CHARLES C. GOSS.

Witnesses:
L. LEE,
THOMAS S. CRANE.

Copies of this patent may be obtained for five cents each, by addressing the "Commissioner of Patents, Washington, D. C."